United States Patent
O'Sullivan et al.

(10) Patent No.: US 11,774,961 B2
(45) Date of Patent: Oct. 3, 2023

(54) SYSTEM AND APPARATUS FOR RESOURCE MANAGEMENT

(71) Applicant: SITA Information Networking Computing USA, Inc., Atlanta, GA (US)

(72) Inventors: Kevin O'Sullivan, Middlesex (GB); Stephane Cheikh, Cointrin (CH); Rico Andreas Barandun, Meyrin (CH); Andrew Eric Malinofsky, Atlanta, GA (US)

(73) Assignee: SITA Information Networking Computing USA, Inc., Atlanta, GA (US)

( * ) Notice: Subject to any disclaimer, the term of this patent is extended or adjusted under 35 U.S.C. 154(b) by 754 days.

(21) Appl. No.: 16/612,138

(22) PCT Filed: May 18, 2018

(86) PCT No.: PCT/IB2018/053523
§ 371 (c)(1),
(2) Date: Nov. 8, 2019

(87) PCT Pub. No.: WO2018/211472
PCT Pub. Date: Nov. 22, 2018

(65) Prior Publication Data
US 2021/0080945 A1    Mar. 18, 2021

Related U.S. Application Data

(60) Provisional application No. 62/508,466, filed on May 19, 2017.

(30) Foreign Application Priority Data

Mar. 2, 2018 (GB) .................................... 1803429

(51) Int. Cl.
*G05D 1/00* (2006.01)
*H04W 76/10* (2018.01)
(Continued)

(52) U.S. Cl.
CPC ......... *G05D 1/0027* (2013.01); *G01C 21/206* (2013.01); *G06F 9/547* (2013.01);
(Continued)

(58) Field of Classification Search
CPC ................. G05D 1/0027; G06Q 10/02; G06Q 10/06315; G06Q 20/18; G06Q 30/0185; G06Q 50/14; G06Q 50/28
(Continued)

(56) References Cited

U.S. PATENT DOCUMENTS 6,807,458 B2   10/2004   Quackenbush et al.
8,700,250 B1   4/2014    Curtis et al.
(Continued)

FOREIGN PATENT DOCUMENTS

CN    102141797 B    9/2012
CN    103576683 A    2/2014
(Continued)

OTHER PUBLICATIONS

Combined Search and Examination Report under Sections 17 and 18(3), issued in Application No. GB1803429.8, dated Aug. 30, 2018.
(Continued)

*Primary Examiner* — Krishnan Ramesh
(74) *Attorney, Agent, or Firm* — Morris, Manning & Martin, LLP; Daniel E. Sineway, Esq.; Adam J. Thompson, Esq.

(57) ABSTRACT

A mobile drive apparatus (1001) for use at a transport hub, having: a drive means configured to drive the apparatus (1001) from a first location (401) to a second location (402)
(Continued)

within the hub; a wireless communication module configured to form a wireless communications link with a resource management system (301), and receive command instructions from the resource management system (301); and a control means coupled to the drive means and coupled to the wireless communication module. The control means is configured to control the drive means to move the apparatus (1001) from a first location (401) to a second location (402) within the transport hub, in response to receiving a command instruction from the resource management system (301) via the wireless communication module.

9 Claims, 12 Drawing Sheets

(51) Int. Cl.

| | | |
|---|---|---|
| *G06F 16/25* | (2019.01) | |
| *G01C 21/20* | (2006.01) | |
| *G06F 9/54* | (2006.01) | |
| *G06N 5/02* | (2023.01) | |
| *G06Q 10/02* | (2012.01) | |
| *G06Q 10/0631* | (2023.01) | |
| *G06Q 20/18* | (2012.01) | |
| *G06Q 30/018* | (2023.01) | |
| *G06Q 50/14* | (2012.01) | |
| *G06Q 50/28* | (2012.01) | |

(52) U.S. Cl.
CPC ........... *G06F 16/252* (2019.01); *G06N 5/027* (2013.01); *G06Q 10/02* (2013.01); *G06Q 10/06315* (2013.01); *G06Q 20/18* (2013.01); *G06Q 30/0185* (2013.01); *G06Q 50/14* (2013.01); *G06Q 50/28* (2013.01); *H04W 76/10* (2018.02)

(58) Field of Classification Search
USPC ............................................................ 701/2
See application file for complete search history.

(56) References Cited

U.S. PATENT DOCUMENTS

| | | |
|---|---|---|
| 2011/0054691 A1 | 3/2011 | Lee et al. |
| 2014/0136414 A1 | 5/2014 | Abhyanker |
| 2016/0167888 A1 | 6/2016 | Messina |
| 2016/0259345 A1* | 9/2016 | McHale ................. G01S 1/70 |
| 2018/0246513 A1* | 8/2018 | Cronin ................. G07F 11/46 |
| 2019/0224843 A1* | 7/2019 | Yang ..................... B25J 9/163 |
| 2020/0047346 A1* | 2/2020 | Yang ..................... B25J 11/008 |

FOREIGN PATENT DOCUMENTS

| | | |
|---|---|---|
| CN | 103753583 A | 4/2014 |
| CN | 105303877 A | 2/2016 |
| CN | 106133781 A | 11/2016 |
| CN | 106355345 A | 1/2017 |
| KR | 2012097978 A | 9/2012 |
| WO | 2016043581 A1 | 3/2016 |

OTHER PUBLICATIONS

Search Report under Section 17(6), issued in Application No. GB1803429.8, dated Jan. 20, 2020.
Office Action issued in Chinese application No. 201880046091.9, dated Mar. 24, 2023.

* cited by examiner

SYSTEM AND APPARATUS FOR RESOURCE MANAGEMENT

CROSS REFERENCE TO RELATED APPLICATIONS

This application is a national phase entry of, and claims the benefit of and priority to, International Patent App. No. PCT/IB2018/053523, filed May 18, 2018, entitled "SYSTEM AND APPARATUS FOR RESOURCE MANAGEMENT," which claims the benefit of and priority to U.S. Provisional Application No. 62/508,466, filed May 19, 2017, entitled "SYSTEM AND APPARATUS FOR RESOURCE MANAGEMENT," and Great Britain Application No. 1803429.8, filed Mar. 2, 2018, entitled "SYSTEM AND APPARATUS FOR RESOURCE MANAGEMENT", each of which are incorporated by reference in their entirety herein.

FIELD OF THE INVENTION

The present invention relates in general to a system, apparatus and method for improved management of electronic resources, particularly for use at a transport hub or travel interchange, such as an airport. Even more particularly, the present invention relates to an electronic apparatus, such as an interactive terminal, for use at an airport hub, rail or bus interchange, port or other travel interchange or termini. The present invention is particularly, but not exclusively concerned with an interactive kiosk for use at an airport hub or travel interchange.

BACKGROUND OF THE INVENTION

The volume of passengers travelling through airports has increased significantly in recent years. This places a greater burden on airport authorities, and airlines, to more effectively manage their resources to accommodate the ever increasing needs and size of their passengers groups. For example, increased passenger volumes can often result in increased congestion at airports. This increased congestion also slows down the throughput of passengers from the airport entrance to the aircraft. This congestion and increasing queues at check-in counters may result in departure delays for airlines and may also impact the airport with additional costs and inefficiencies, as more staff are required to manage and coordinate passengers and their baggage. Furthermore, increased congestion can become particularly problematic in uncontrollable or unexpected circumstances. For example, in the event of unexpected bad weather, or unexpected maintenance in a portion of the airport, congestion can become particularly problematic.

It would therefore be desirable to provide the likes of transport authorities, and transport providers with an improved system, apparatus and method for management of electronic resources for use at a transport hub or travel interchange, such as an airport.

SUMMARY OF THE INVENTION

The invention is defined in the appended claims to which reference should now be made. Embodiments of the invention seek to address the above problems by providing an improved system, apparatus and method for management of electronic resources for use at a transport hub or travel interchange, such as an airport.

According to a first aspect of the present invention there is provided a mobile drive unit or mobile drive apparatus, preferably for use at a transport hub. The mobile drive apparatus comprises a drive means configured to drive the apparatus from a first location to a second location within the transport hub; a wireless communication module configured to form a wireless communications link with a resource management system, and receive command instructions from the resource management system; and a control means coupled to the drive means and coupled to the wireless communication module. The control means is configured to control the drive means to move the apparatus from a first location to a second location within the transport hub, in response to receiving a command instruction from the resource management system via the wireless communication module.

According to a second aspect of the present invention, there is provided a mobile drive apparatus for use at a transport hub, the apparatus comprising: a drive means configured to drive the apparatus between two or more locations within the transport hub; a wireless communication module configured to form a wireless communications link with one or more remote computers or servers, such as a departure control system, and receive data from each of the remote computer or server relating to the transport hub; and a control means coupled to the drive means and coupled to the wireless communication module; wherein the control means is configured to analyse the data received from each of the remote computers or servers, and determine whether the drive apparatus should be moved from its current location to a new, different location within the transport hub; and wherein, if the control means determines that the apparatus should be moved to a new, different location, the control means is further configured to issue a command instruction to the drive means to control the drive means to move the apparatus to the new, different location.

According to a third aspect of the present invention, there is provided a resource management system for managing deployment of one or more mobile drive apparatus in a transport hub, the system comprising: a data input module configured to receive data from one or more data sources, said data relating to the transport hub; a process director coupled to the data input module and configured to analyse the data received via the data input module, and determine whether one or more threshold criteria has been met; and a resource communication module coupled to the process director, the resource communication module being configured to issue a command instruction to one or more mobile drive units when the process director has determined that the one or more threshold criteria has been met, wherein said command instruction comprises an instruction for the mobile drive apparatus to move to a specified location within the transport hub.

According to a fourth aspect of the present invention, there is provided a resource management system for managing deployment of one or more mobile interactive kiosks in a transport hub, the system comprising: a data input module configured to receive data from one or more data sources, said data sources including a departure control system, wherein the data received from the departure control system relates to a flight that has been cancelled within the transport hub; a process director coupled to the data input module and configured to analyse the data received via the data input module relating to the cancelled flight, the process director being further configured to: identify an area within the transport hub associated with the cancelled flight; determine whether there are a sufficient number of interactive kiosks present within said identified area for servicing the passengers affected by the cancelled flight, wherein said determination is based at least in part on a rules based engine, preferably utilising data received from the one or more data sources; and identify whether one or more additional mobile interactive kiosks are available in another, different area of the transport hub; wherein the system further comprises a resource communication module coupled to the process director, the resource communication module being configured to issue a command instruction to any additional available mobile interactive kiosks that have been identified by the processor director, when the process director has determined that there is not a sufficient number of interactive kiosks present within the area associated with the cancelled flight; and wherein the command instruction and comprises an instruction for said identified and available one or more kiosks to move to the area associated with the cancelled flight.

According to a fifth aspect of the present invention, there is provided a resource management system for managing deployment of one or more mobile interactive kiosks in a transport hub, the system comprising: a data input module configured to receive data from one or more data sources, said data sources including a departure control system, wherein the data received from the departure control system relates the number of passengers that have checked in for a flight that is due to depart from the transport hub; a process director coupled to the data input module and configured to analyse the data received via the data input module relating to the departing flight, preferably together with data received from at least one other data source, wherein the process director is further configured to: determine whether there are a sufficient number of interactive kiosks present within a check-in area associated with said departing flight, based at least in part on a rules based engine and the data received from the departure control system; and identify whether one or more additional mobile interactive kiosks are available in another, different area of the transport hub; wherein the system further comprises a resource communication module coupled to the process director, the resource communication module being configured to issue a command instruction to any additional available mobile interactive kiosks that have been identified by the processor director, when the process director has determined that there is not a sufficient number of interactive kiosks present within the check-in area associated with said departing flight; and wherein the command instruction and comprises an instruction for said identified and available one or more kiosks to move to the check-in area associated with said departing flight.

According to a sixth aspect of the present invention, there is provided a method of managing deployment of one or more mobile drive apparatus in a transport hub, the method comprising, preferably at a server: receiving data from one or more data sources, said data relating to the transport hub; analysing the received data to determine whether one or more threshold criteria has been met; and issuing a command instruction to one or more mobile drive units if the analysing step results in a determination that the one or more threshold criteria has been met, wherein said command instruction comprises an instruction for the one or more mobile drive apparatus to move to a specified location within the transport hub.

According to a seventh aspect of the present invention, there is provided a method of managing deployment of one or more mobile interactive kiosks in a transport hub, the method comprising, preferably at a resource management system: receiving data from one or more data sources, said data sources including a departure control system, wherein the data received from the departure control system relates to a flight that has been cancelled within the transport hub; analysing the received data, including the data relating to the cancelled flight; identifying an area within the transport hub associated with the cancelled flight; determining whether there are a sufficient number of interactive kiosks present within said identified area for servicing the passengers affected by the cancelled flight, wherein said determination is based at least in part on a rules based engine, preferably utilising data received from the one or more data sources; identifying whether one or more additional mobile interactive kiosks are available in another, different area of the transport hub; and issuing a command instruction to any additional available mobile interactive kiosks that have been identified, if the determining step has resulted in a determination that there is not a sufficient number of interactive kiosks present within the area associated with the cancelled flight, wherein the command instruction comprises an instruction for said identified and available one or more kiosks to move to the area associated with the cancelled flight.

According to an eighth aspect of the present invention, there is provided a method of managing deployment of one or more mobile interactive kiosks in a transport hub, the method comprising, preferably at a resource management system: receiving data from one or more data sources, said data sources including a departure control system, wherein the data received from the departure control system relates the number of passengers that have checked in for a flight that is due to depart from the transport hub; analysing the received data, including the data relating to the departing flight, preferably together with data received from at least one other data source; determining whether there are a sufficient number of interactive kiosks present within a check-in area associated with said departing flight, based at least in part on a rules based engine and the data received from the departure control system; and identifying whether one or more additional mobile interactive kiosks are available in another, different area of the transport hub; and issuing a command instruction to any additional available mobile interactive kiosks that have been identified by the identifying step, if the determining step has resulted in a determination that there is not a sufficient number of interactive kiosks present within the check-in area associated with said departing flight; wherein the command instruction comprises an instruction for said identified and available one or more kiosks to move to the check-in area associated with said departing flight.

According to a ninth aspect of the present invention, there is provided a method of deploying a mobile drive apparatus for use at a transport hub, the method comprising, preferably at the mobile drive apparatus: forming a wireless communication link with a resource management system, preferably via a wireless beacon within the transport hub; receiving a command instruction from the resource management system via the wireless communication link; initiating a drive function on the mobile drive apparatus in response to receiving the command instruction, said drive function being configured to drive the apparatus from a first location to a second location within the transport hub.

According to a tenth aspect of the present invention, there is provided a method of deploying a mobile drive apparatus for use at a transport hub, the method comprising, preferably at the mobile drive apparatus: forming a wireless communication link with one or more remote computers or servers, such as a departure control system, preferably via a wireless beacon within the transport hub; receiving data relating to the transport hub via the wireless communication link, said data originating from the one or more remote computers or servers; analysing the data received via the wireless communication link, and determining whether the drive apparatus should be moved from its current location to a new, different location within the transport hub, preferably based at least in part on a rules based engine and the data received from the departure control system; issuing a command instruction to a drive means of the mobile drive apparatus if the analysing step has resulted in a determination that the apparatus should be moved to a new, different location within the transport hub; initiating a drive function on the mobile drive apparatus in response to receiving the command instruction, said drive function being configured to drive the apparatus to the new, different location within the transport hub.

In one preferred implementation of the present invention, the mobile drive unit or apparatus is a mobile interactive kiosk. Such a kiosk differs from transport kiosks known in the art, in that it is mobile, rather than fixed in a specific place in the transport hub. That is, the kiosk comprises drive means that can move the kiosk between specific locations within the transport hub environment. This advantageously allows the kiosk to be rapidly deployed to a specified area of the transport hub, if a determination has been made that the kiosk would be better utilised in said area. For example, in the context of an airport environment: if a flight is unexpectedly cancelled, a determination can be made that a specified area of the airport is likely to experience an unexpected increase in passenger levels, because passengers for said cancelled flight will be directed to said specified area for re-booking. With embodiments of the present invention, the mobile drive kiosk can rapidly deployed itself to said specified area to provide additional resources for enabling said additional passengers to be re-booked onto other flights. This rapid deployment would not be possible with transport kiosks known in the art, since they are fixed in place and would require extensive time consuming manual intervention in order to unfix them from their current location and install them in a new location in the airport.

Some of the preferred features of the various aspects of the present invention will now be described. It will be appreciated by one of skill in the art that each preferred feature described below, may be equally applicable to one or more of the aspects of the present invention. It will be further appreciated that the preferred features may be combinable with one another in any suitable combination.

Preferably, the control means is configured to receive and analyse data from two or more different data sources, and issue the command instruction to the drive means based on the analysis of the data received from the two or more data sources. Preferably, said data sources include at least two of: a departure control system; a transport hub inventory, such as an inventory of the mobile drive apparatus present in the transport hub; air traffic control; airport operations; airline systems; airport online database, gate agents and the like.

Preferably, the command instruction comprises a locational component for indicating the specified location within the transport hub that the drive apparatus should move to. Alternatively or additionally, the command instruction preferably comprises a temporal component for indicating when the drive apparatus should move to the specified location within the transport hub.

Preferably, the mobile drive apparatus comprises a memory storing a map depicting at least an area of a transport hub. Preferably, the mobile drive apparatus is configured to use the map to navigate between a first location and a second location within the area of the transport hub, along one or more predetermined paths. Preferably, the mobile drive apparatus is configured to determine the one or more paths.

Preferably, the mobile drive apparatus comprises one or more sensors configured to detect one or more objects in proximity to the mobile drive apparatus and alert the control means, in the event that an object is detected. The sensors may be laser sensors.

Preferably, the mobile drive apparatus is an interactive kiosk. Preferably, the interactive kiosk is configured to provide one or more of the following services or functions: check-in, flight booking, flight re-booking, ticket changing, airport information, flight status checking, document verification, passenger verification, boarding pass printing, bag tag printing and the like.

Preferably, the process director is further coupled to a resource database containing data related to the current state of one of more resources in the transport hub. Preferably, such data includes data relating to the current state of the one or more mobile apparatus within the transport hub. The data relating current state may include: data relating to the current location, battery level, usage, and demand level of each of the one or more mobile apparatus.

Preferably, the process director is configured to analyse the received data using a rules based engine. The rules based engine may be fixed or dynamic. The rules based engine may utilise existing data, such as data contained in a resource database, as well as the received data.

Preferably, the process director is configured to receive and analyse data from two or more different data sources, and the resource communication module is configured to issue the command instruction to the mobile drive apparatus based on the analysis of the data received from the two or more data sources.

Preferably, the data input module is further configured to perform a service call to a database associated with a transportation hub. Preferably, the service call is a SOAP XML Web service call communicated using a secure transfer protocol or a rest API call.

BRIEF DESCRIPTION OF THE DRAWINGS

Embodiments of the invention will now be described, by way of example only, and with reference to the accompanying drawings, in which.

Figure 1A:
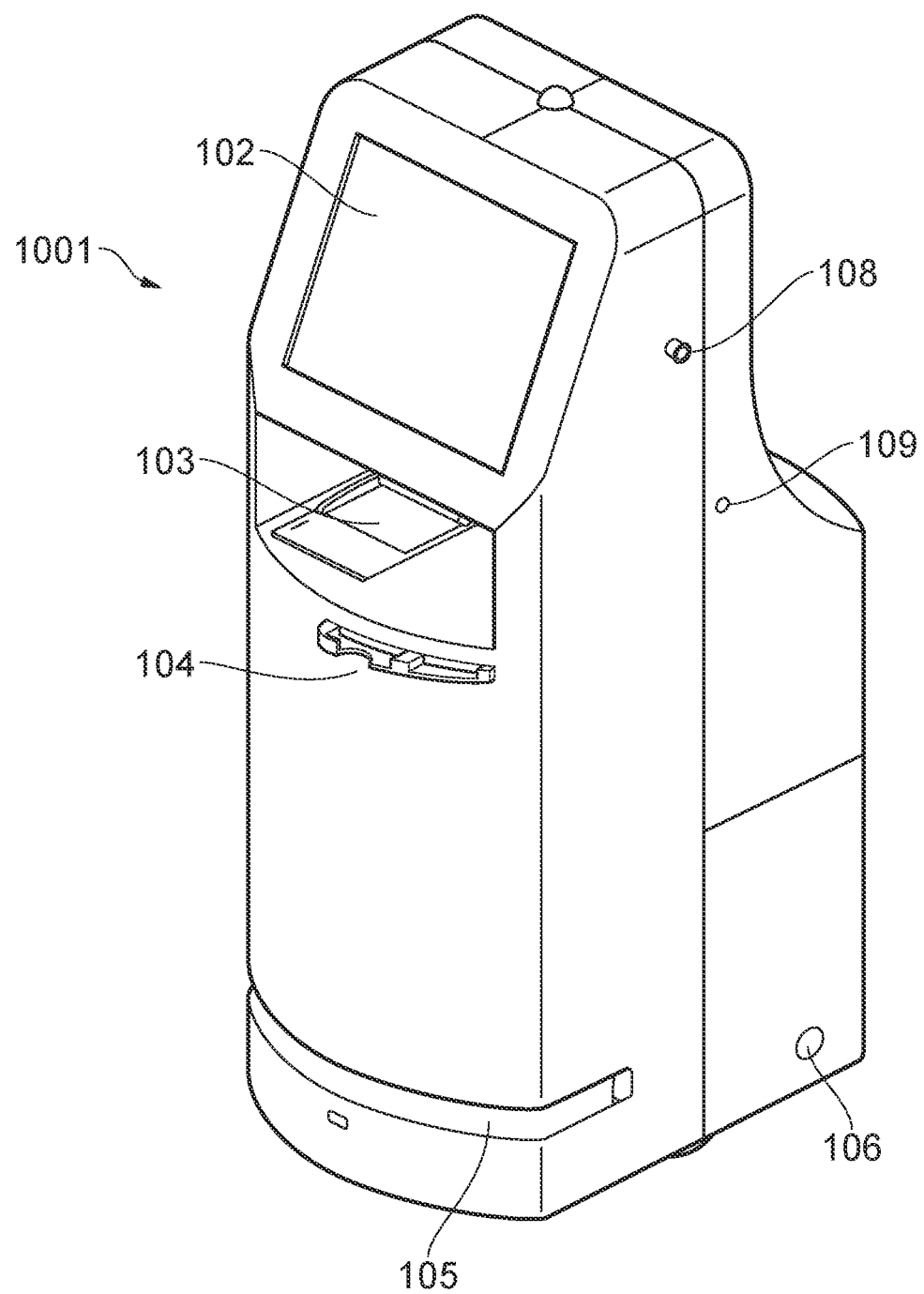
FIGS. 1a and 1b are perspective views of a mobile drive apparatus according to an embodiment of the invention.

The following description is of a system, apparatus, and method of operation of a drive unit for use in the aviation industry, but this is exemplary and other applications of the invention will also be discussed. For example, embodiments of the invention find application in the travel industry in general for example rail, air, coach industries and the like.

Further, the system, apparatus and method embodying the invention may be used in any environment where it may be desirable to deploy a mobile drive apparatus to a specified location within a transport interchange, hub or depot. For example, the method and system may find application in the rail, coach and shipping sectors in addition to the aviation sector examples described below.

The below description refers to embodiments where the mobile drive apparatus is an interactive electronic kiosk, such as a kiosk having check-in functionality. However, it will be appreciated that many of the embodiments could be equally described with reference to other forms of mobile drive apparatus for use in a transport hub environment. For example, the mobile drive apparatus could be a cleaning robot, an item transport robot, such as a luggage transport robot, and a security terminal.

The interactive electronic kiosk may be configured to provide a number of services or functions. For example, the kiosk may be configured to provide one or more of the following services or functions: check-in, flight booking, flight re-booking, ticket changing, airport information, flight status checking, document verification, passenger verification, boarding pass printing, bag tag printing and the like. The check in kiosk may therefore comprise one or more of the following: a display screen, preferably a touch-screen display; a reader, such as barcode or passport scanner; a printer, such as a boarding pass or bag tag printer; a microphone; a camera, preferably associated with facial recognition software; and one or more audio speakers.

As described in more detail below, the interactive electronic kiosk may also comprise one or more wheels, which may include guide wheels such as casters, as well as drive wheels for driving the kiosk. The kiosk may comprise one or more batteries for powering the drive means. A charging port may be provided on the kiosk for charging the one or more batteries. The kiosk may also include one or more sensors, such as laser sensors for alerting the kiosk of nearby objects, particularly when the kiosk is navigating along a predefined path from a first location to a second location.

The kiosk comprises a wireless communication module. This enables the kiosk to form a wireless communication link with one or more remote servers such as a departure control system, and/or a resource management system. The kiosk may connect to such servers via one or more wireless beacons distributed within the transport hub environment. Consequently, as the kiosk moves through the transport hub environment, the wireless communication link may be required to switch between beacons within the hub, based on whichever beacon can best service the kiosk, e.g. the beacon that can provide the strongest signal or that resides closest to the intended path of the kiosk.

Figure 1B:
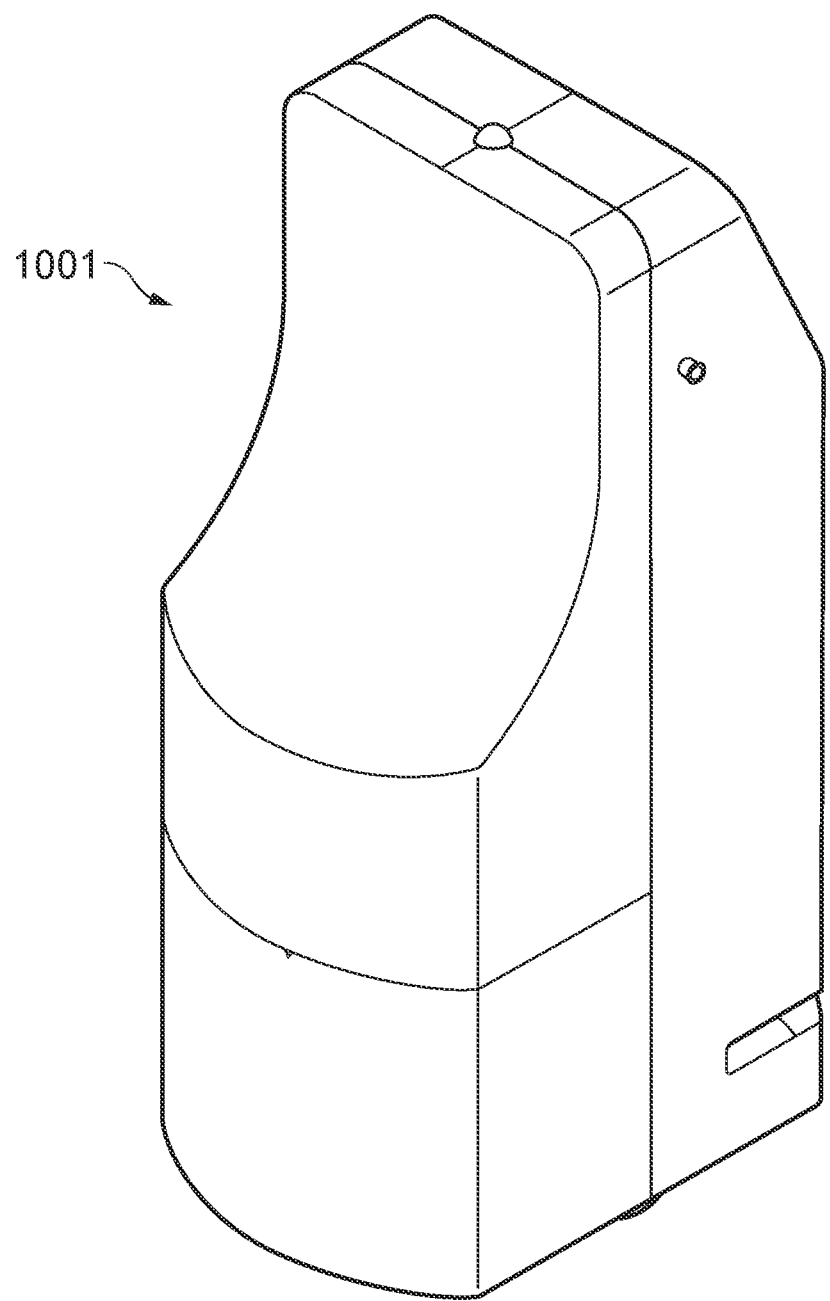
Figure 2:
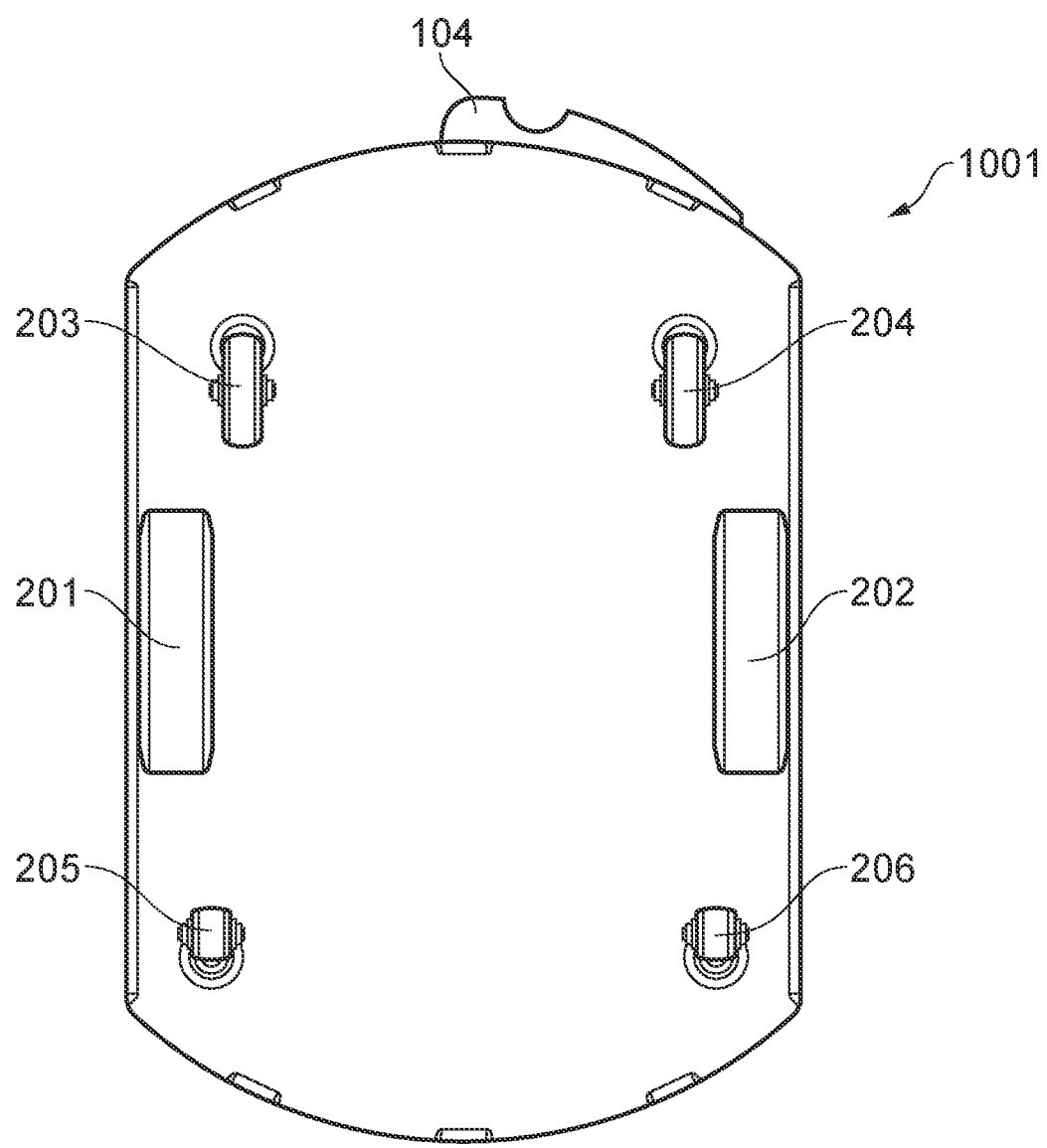
FIG. 2 is a bottom view of the mobile drive apparatus of FIGS. 1a and 1b.

Referring now to FIGS. 1a, 1b and 2 of the drawings, in an embodiment of the present invention, the mobile drive apparatus is a mobile electronic kiosk 1001. The kiosk has an interactive touch screen 102, that an airline passenger can interact with in order for the kiosk to perform one or more functions, such as check-in, flight booking, flight re-booking, ticket changing, airport information, flight status checking, document verification, passenger verification, boarding pass printing, bag tag printing and the like. The kiosk 1001 has an identity document scanner in the form of a passport scanner 103, and a print-out tray 104 onto which the kiosk can print a boarding pass and/or bag tag. The kiosk also has a slot 105 at its lower end for one or more internal laser sensors (not shown). A further access port 106 is provided towards the rear of the kiosk. An emergency stop button 108 is provided on a side wall of the kiosk 1001. This may enable a person to disable the kiosk. A key slot 109 is also provided on a side wall of the kiosk 1001. This can allow the kiosk 1001 to be opened for maintenance.

As best seen from the bottom view of FIG. 2, the base of the mobile kiosk 1001 comprises a plurality of wheels for enabling the kiosk to travel around an airport. In particular the kiosk has two drive wheels 201, 202 which are coupled to a drive mechanism that is controlled by a control means within the kiosk 1001. The drive wheels 201, 202 can be driven independently of one another to allow for turning of the kiosk 1001. The kiosk also has a pair of front caster wheels 203, 204 and a pair of rear caster wheels 205, 206, which can provide additional stability and control for the kiosk 1001 as it travels through the airport. The drive mechanism is powered by one or more internal rechargeable batteries within the kiosk 1001. The drive unit comprises at least one battery unit and preferably, a split battery arrangement is provided. A first battery may be positioned a few centimetres in front of the axis of rotation of each wheel. The battery or cell may be a 24 Volt, 177 Ah cell and may have a weight of about 60 kg each. This may provide between 4 and 12 hours of operation without charging dependent upon use. The first battery is usually positioned so that it approximately lies in the same plane as each drive wheel and each associated drive motor. The drive motors may form a differential drive unit which may be controlled by the processor associated with the drive unit (not shown in the drawings). A second battery may be positioned towards the front of the drive unit. The split battery arrangement means may help the drive unit to be substantially equally balanced around the pivot axis of the two drive wheels.

The kiosk also has a wireless communication antenna (not shown) and a wireless communication module (not shown) that allow the kiosk to form a wireless communications link with one or more servers. The link may be formed via one or more beacons within the airport.

In more detail, the kiosks themselves are self-driving, autonomous and wirelessly connected airport devices. The kiosks navigate using terminal layout data, a wireless data connection to the control system in the server, a laser scanning tool for locating themselves in the airport within a set of allowed paths between points on the map. A collision avoidance mechanism allows small deviations around e.g. people in the airport, while following the allowed paths.

The laser scanning capability is used by the kiosks to create the terminal layout data. By self-driving and locating the coordinates of obstacles, boundaries, peculiarities detected etc. in the terminal, it is possible for the kiosk to create a map of the layout of the airport boundaries and obstacles. This map can be uploaded to the cloud management system for verification and modification, according to other desires/rules of the building to define areas that kiosks are to be excluded from either stopping or driving through. Alternatively, the map can be manually input to the database.

Once this map database has been defined and distributed amongst the kiosks, they can then navigate themselves through the airport using the laser scanning tool for measuring proximity to airport features via light travel time between emitting and receiving reflected beams, in conjunction with a measure of orientation e.g. Electronic compass/Magnetometer. They are also able to collate other measurable data e.g. wireless connection strength, in order to add additional parameters regarding whereabouts the kiosks can operate. Once this map data is available, the laser scanning can then be used to detect obstructions within the airport such as passengers, stranded baggage, or other typical obstructions within an airport.

The kiosks are connected over Wi-Fi to the management platform, via a system that is tolerant of an intermittent connection, which may be likely given they will travel through various zones in the airport terminal. However, the kiosks require a Wi-Fi connection to process passenger/bag data and upload it to the airport's various databases, which may limit the locations they may function.

The airport has a dedicated maintenance area which the kiosks can take themselves to when needed, with self-diagnosing systems detecting the need for attention to any of their systems. The area is equipped with charging/docking stations that kiosks can take themselves to in order to restore battery charge. They also have a port in the back to allow manual control via a joystick, or to plug in to the system to access the internal systems.

In embodiments of the invention a resource management platform or system is provided to manage deployment of one or more mobile drive apparatus in a transport hub. One such embodiment is represented by FIG. 3.

Figure 3:
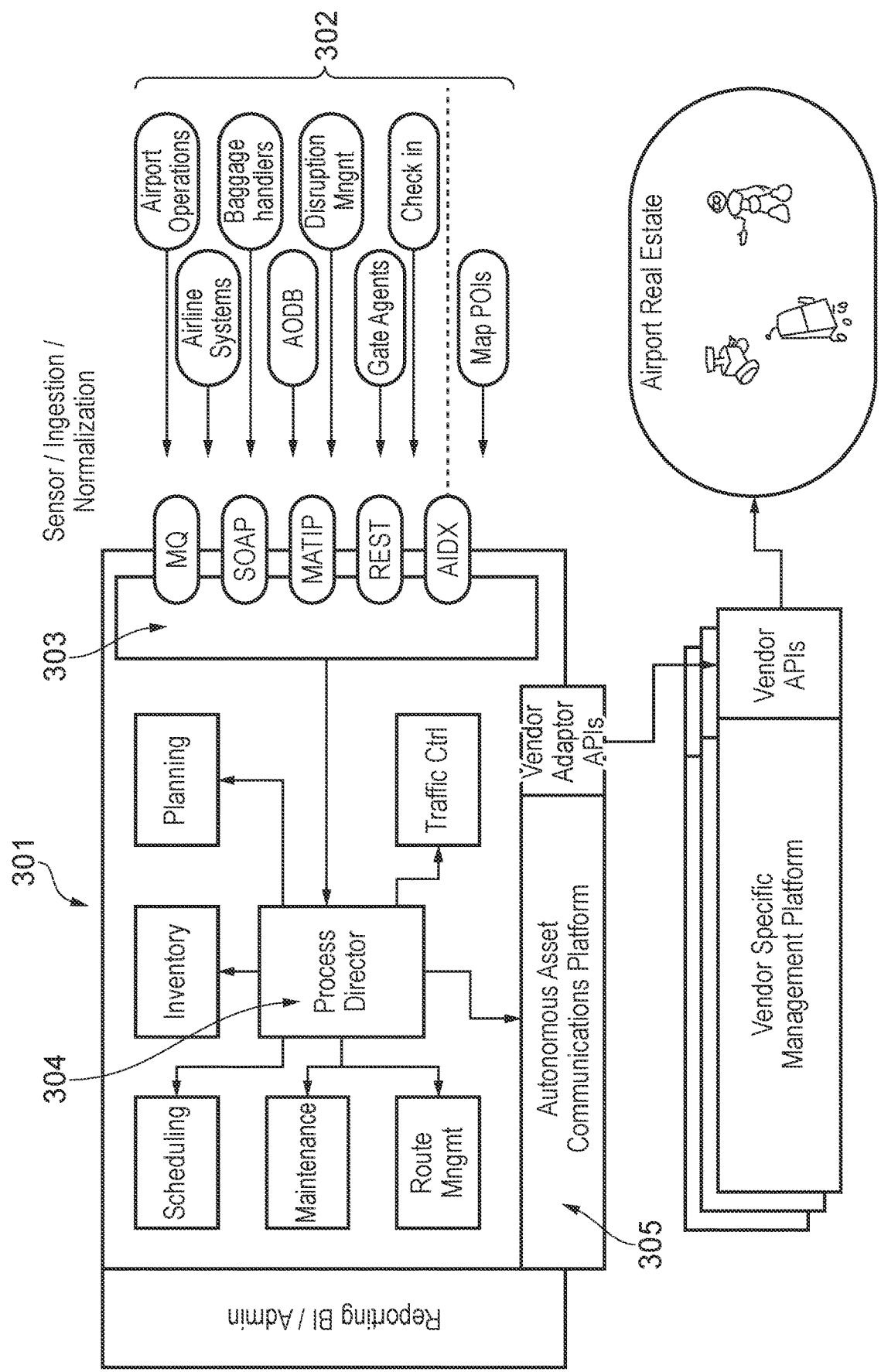
FIG. 3 is a schematic diagram showing the main functional components of a resource management system according to one embodiment of the invention.

The management platform 301 of FIG. 3 enables the smart deployment of kiosks at a useful time and to a useful location. Other benefits from mobile kiosks include making cleaning easier, generating clear evacuation routes during fire alarms, as well as extra kiosk deployment to help process large numbers of passengers in a short space of time due to disruption. The management platform has information on airport schedules, device maintenance, the airport layout, as well as live data from e.g. baggage handling, air traffic control etc. It is then able to use this full set of data to deploy the appropriate number of kiosks when and where they are to be most effective.

The management platform is shown in the schematic in FIG. 3. Data sources 302 are on the upper right, in orange, and show the many types of data feed that can be used by the system, over several different protocols etc. shown in the white blocks. The data are then given to a Process Director 304 which will analyse all the data to provide temporal and locational instructions to kiosks through the Autonomous Asset Communications Platform. This will involve assessing the data via a rules engine/AI system to make decisions on kiosk deployment. Example rules could be "If number of passengers affected by cancellation exceeds number of static kiosks by a factor of 2, deploy the minimum number of kiosks such that this is fraction is brought below 2, for a duration of 2 hours" In this Figure, The Process Director 304 also administers scheduling, inventory, planning, traffic control, route management and maintenance throughout the airport. Other data which may be analysed by the Process Director can include, for example, a CCTV-fed video analytics system, from which the system may determine that a very large number of people are queueing in a zone—in response, the Process Director may direct an appropriate number of kiosks to that area to ease the congestion.

At the top level, the various data inputs, and aspects considered by the Process Director, are all available for analysis via the business intelligence/reporting functionality. This can provide KPIs, big data analytics, efficiency metrics, utilisation measures etc. and allow the system to be analysed in order to determine if e.g. more kiosks are needed, or if they are currently under-utilised and could benefit from changes to the Process Director's decision making functionality in order to deploy them more frequently.

The system's outputs can be used widely throughout the airport through individual vendor APIs. This allows a detailed reporting and analysis functionality in order to study the system's behaviour.

Figure 4:
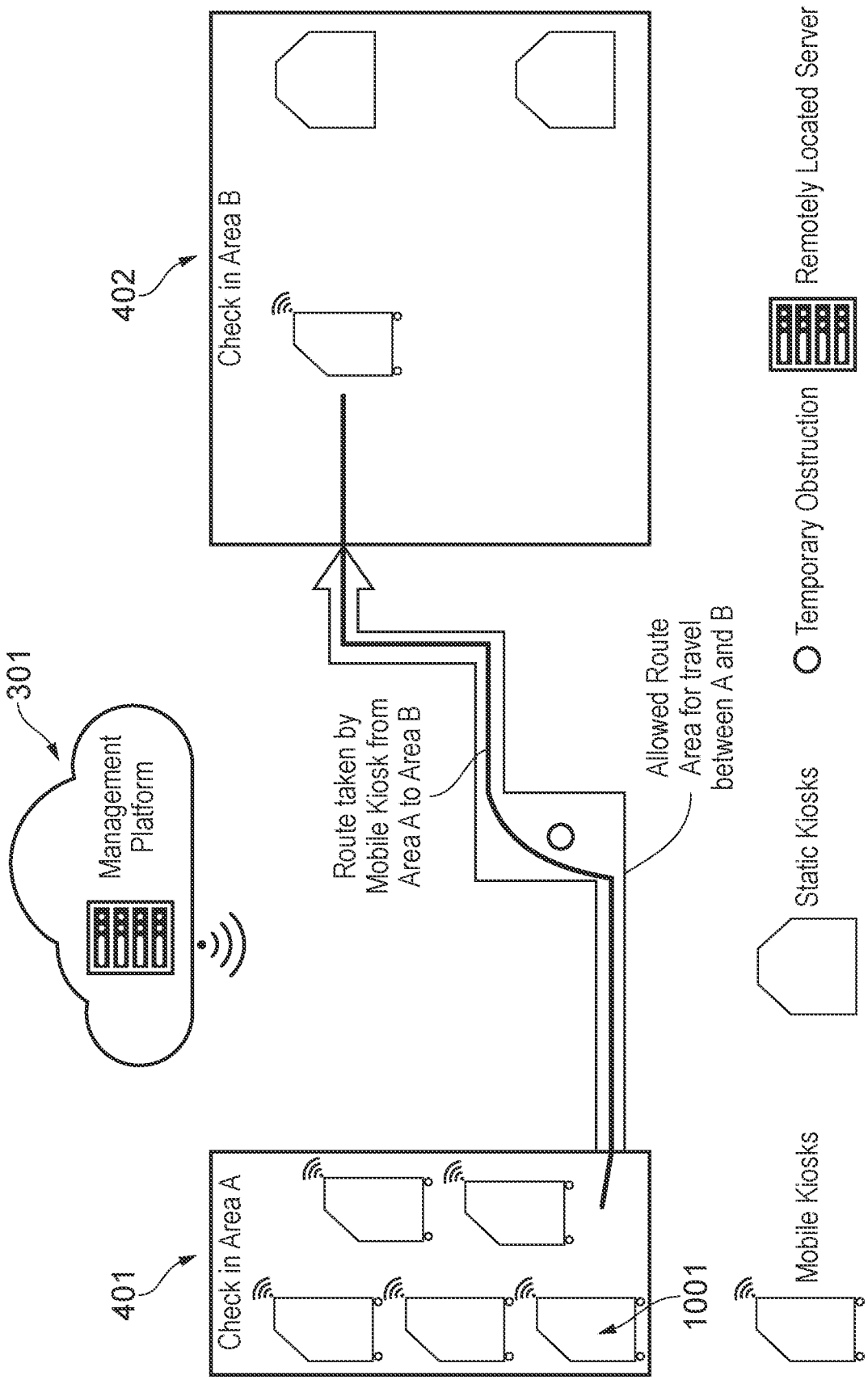
FIG. 4 is a schematic diagram showing an example embodiment of a system according to the invention, including a plurality of mobile drive apparatus.

The control messages from the Process Director are sent over the communications platform 305, which is a wireless connectivity means such as Wi-Fi. This is shown in the green area of the diagram. This data is then available through APIs, and sent to the Vendor Specific Management Platform to send the relevant commands to the vendor-specific kiosks. The kiosks/robotic machinery then receives this temporal and locational information, and either determines which of the set of allowed paths is optimal for navigation to this location, or receives the ideal path as part of the instruction, which is followed by the kiosk taking the ideal path to this location. This is shown in FIG. 4, where a kiosk is told to migrate from Check in Area A to Area B. The kiosk travels within the permitted path from A to B, taking a deviation around a temporary obstruction (this might be any temporary obstruction, such as an abandoned luggage trolley, or a person obstructing the kiosk's travel path)

The scenario shown in FIG. 4 is as follows:

1) Flight is cancelled, leaving a full flight's worth of passengers looking to all rebook onto the next available flight to the same destination 2) Data regarding cancelled flight enters management platform, and is received at the Process Director 3) Process Director 304 analyses data and through a rules database engine or form of AI predicts a likely surge in passengers needing to use check-in kiosks in Check-in Zone B to re-book flights. This check in zone only has 2 active, static kiosks, yet there are many passengers looking to use the facilities simultaneously.

4) Process Director 304 determines that a subset of mobile kiosks in Check-in Zone A are currently under-utilised (identified by unique ID number), and that they are the best positioned kiosks for deployment into Check-in Zone B due to their proximity.

5) Process Director 304 generates temporal and locational instructions for subset of mobile kiosks in Check-in Zone A to move to Zone B—including which route to take 6) Data packet of instructions sent to Autonomous Asset Communications Platform and communicated via in/out APIs to Vendor Specific Management platform 7) Vendor-specific temporal and locational instructions communicated over Wi-Fi to subset of mobile kiosks which are required to move to Check-in Zone B 8) Mobile kiosks begin to move along said predetermined path 9) Mobile kiosks encounter temporary obstruction within the path, and deviate from predetermine path by minimal amount such that they can continue on the path 10) Mobile kiosks position themselves in predetermined locations in Zone B The result is that the various autonomous kiosk solutions can be deployed in an appropriate number, time and location to resolve a detected situation.

This negates the need for a manager to observe the situation developing, and have staff deploy and even operate the kiosks, thereby minimising disruption in an autonomous and highly efficient way.

The following five examples will now be described with reference to the information provided in FIGS. 5-9.

EXAMPLE 1

Figure 5:
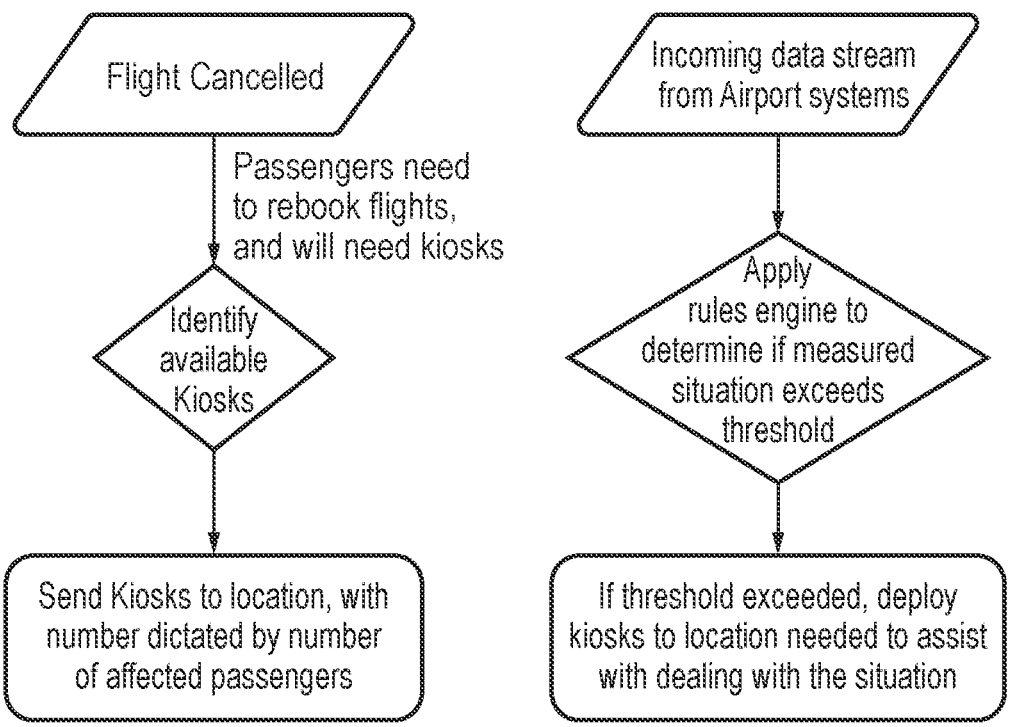
FIG. 5 depicts a first example scenario according to an embodiment of the invention.

In this first example depicted by FIG. 5, a cancelled flight has resulted in hundreds of passengers who now need to re-book onto new flights, and check in. This is detected by the system from the airport data feed into the management platform, in this instance an alert is sent containing flight cancellation details. Normally, these passengers would cause large queues at existing infrastructure. With automated, mobile kiosks managed by a system which receives the data on flight cancellations, a set of kiosks can be deployed to the appropriate location in order to dramatically reduce queues. This improves the passenger experience and reduces congestion in the terminal.

EXAMPLE 2

Figure 6:
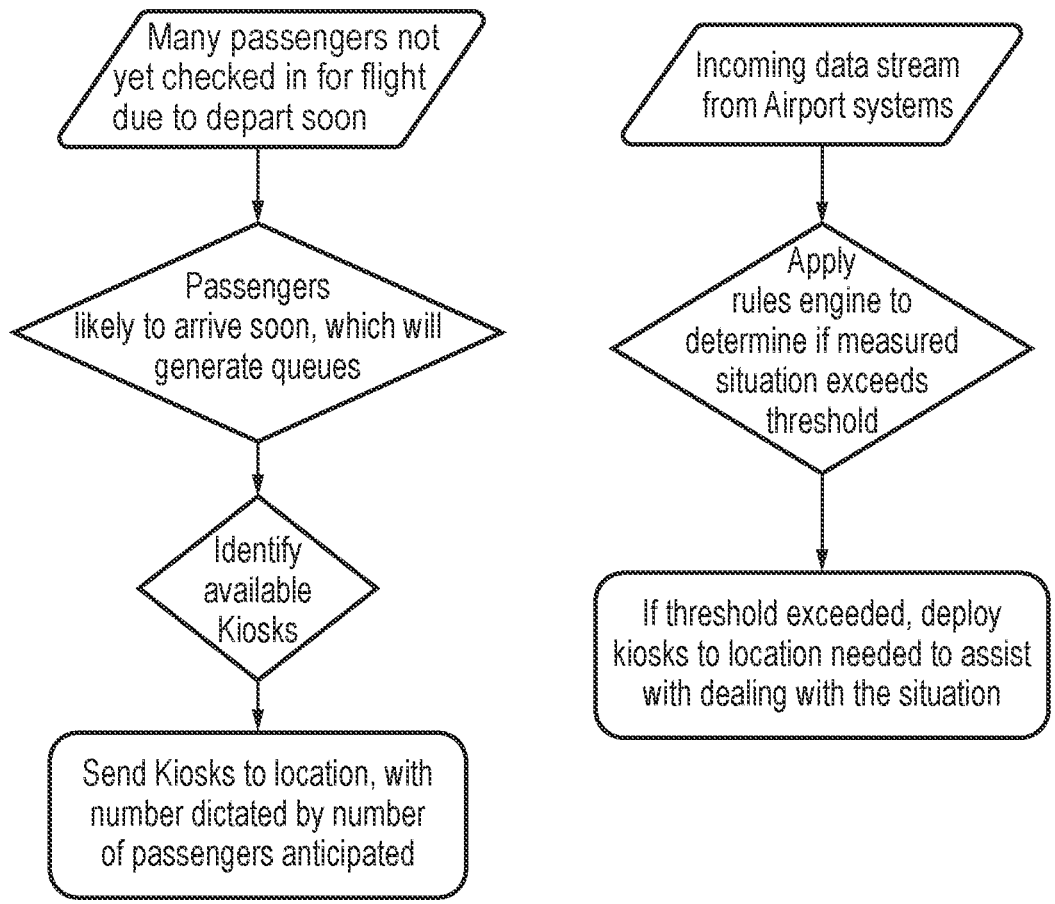
FIG. 6 depicts a second example scenario according to an embodiment of the invention.

In this second example scenario depicted by FIG. 6, it is observed that a flight due to depart soon has a significant number of passengers who are yet to check in at the airport. This will be determined from the top-level data feed into the system from the many airport systems. This means that it is likely that many of these passengers will arrive at the terminal in a very short time frame, potentially generating very large queues. In anticipation of this, the system realises many passengers are due to check in very soon, and a number of kiosks can be deployed to the appropriate check in area to ease queues.

EXAMPLE 3

Figures 7, 8:
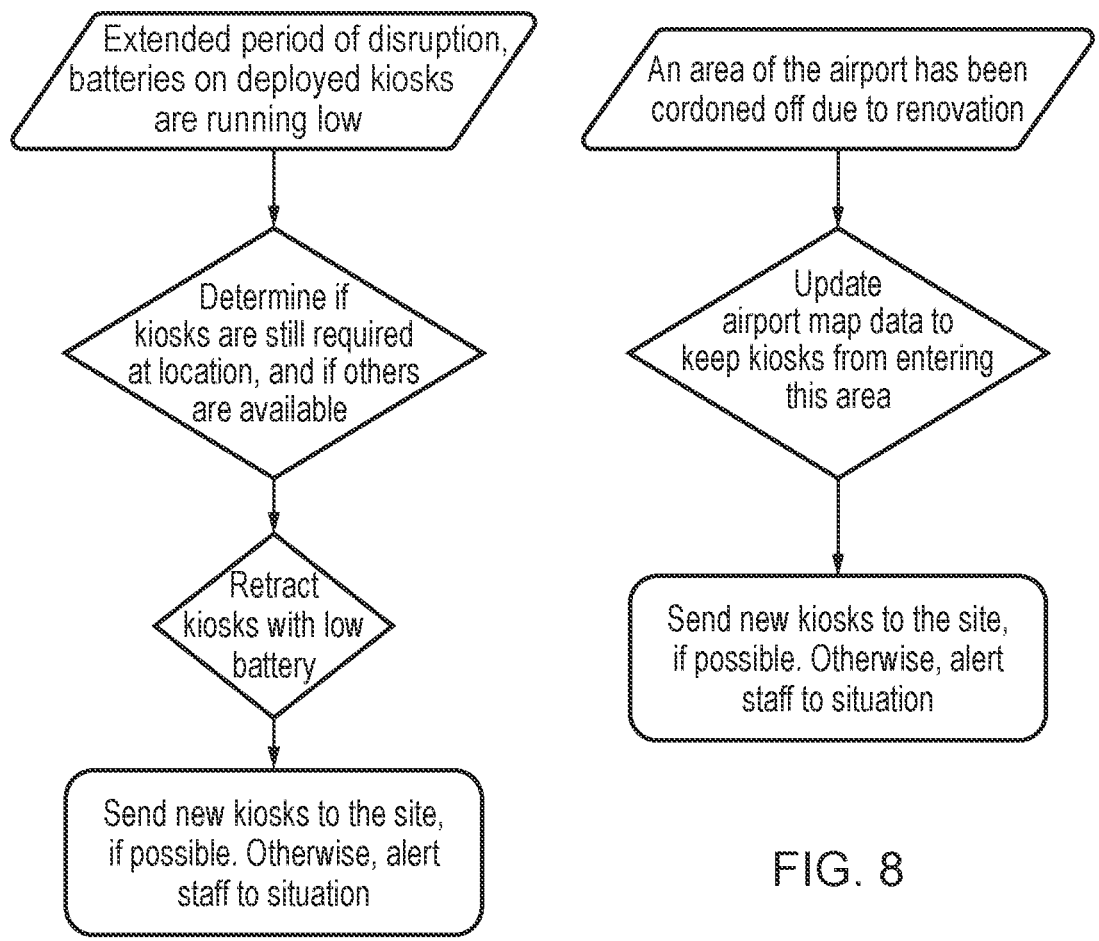
FIG. 7 depicts a third example scenario according to an embodiment of the invention.
FIG. 8 depicts a fourth example scenario according to an embodiment of the invention.

In this third example depicted by FIG. 7, many kiosks have been deployed for a long time. These are due back at the docking stations to charge their batteries. The kiosks in need of charging are retracted, and new kiosks deployed to replace them in their role at that location in the airport. If no kiosks are available, an alert is sent to airport staff to enable them to act accordingly to ease the queues.

EXAMPLE 4

In this third example depicted by FIG. 8, an area of the airport can no longer be accessed, due to e.g. spillage of liquid, renovation, security alert etc. This would be part of a kiosk's route for accessing a deployment location, or for returning to the maintenance/storage area after deployment. This area is modified on the map, such that the kiosks won't access it.

EXAMPLE 5

Figure 9:
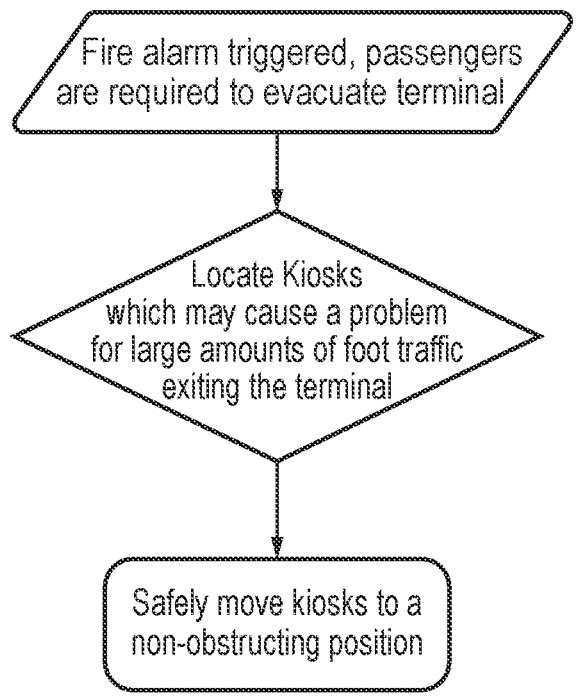
FIG. 9 depicts a fifth example scenario according to an embodiment of the invention.

In this third example depicted by FIG. 9, the fire alarm has been triggered and passengers must evacuate the building, passing through an area with the autonomous kiosks deployed throughout the foyer. Kiosks that are in the path of passengers will be flagged as such, and instructed to move. Using sensors to ensure passengers are not collided with/obstructed, the kiosks move themselves out of the way in order that passengers can safely and quickly evacuate the terminal.

The one or more sources of data that feed into the resource management system may include a departure control system, and aspects of the resource management system may analyse data received from the DCS to determine whether a command instruction should be sent to the mobile drive apparatus, based on the analysed data. Alternatively or additionally, the mobile drive apparatus may directly receive data from the one or more sources of data, such as the DCS, and analyse the received data itself and determine whether it should issue a command instruction to its drive means, based on the analysed data. In any event, the departure control system, DCS 1003 may optionally comprise a local or remotely stored database 1005. Usually, the departure control system resides on a computer or server which is communicatively coupled, via wired or wireless communication means, such as a transmitter or receiver, to the drive unit 1001, preferably via the resource management system. Alternatively, or in addition, the departure control system may be communicatively coupled to a central server or computer 1007 which may be communicatively coupled to the drive unit 1001 as well as one or more additional drive units, not shown in FIG. 1. In any event, the departure control system may also be communicatively coupled to a ticketing or/and sales control system which controls the sale of tickets.

The database 1005 may be stored on a writeable or rewriteable storage medium such as hard disk or solid state storage means such as flash drive, ROM, RAM, or other storage means which will be known to the skilled person, such as cloud storage. The database usually comprises passenger data associated with a passenger who has previously booked or made a reservation for a ticket for travel on a particular scheduled flight operated by an airline. Such departure control systems and ticketing/sales control systems are well known to the skilled person, and therefore will not be described in further detail. The DCS may comprise a server or computer hardware coupled to the storage medium.

The drive unit 1001 may comprise computer hardware or software which when executed undertakes one or more predetermined method steps, which will be described in further detail with reference to FIGS. 4a and b of the drawings. The software may comprise one or more modules which may be communicatively coupled to the central server 1007 for example via a bus or via other wired or wireless communication means.

The central server 1007, which may be coupled to a control center 1009 may comprise one or more of an application programming interface, API, 105. The API may be configured to provide one or more modules for central management of a fleet of drive units. A control module may be provided which allows an operator to monitor the current location of the drive unit. The control unit may also be configured to change a route followed by the drive unit if needed. Further, faults occurring on a drive unit which prevent it from performing a task may be transmitted to the server 1009 or/and to the control center 1009. Similarly, any damage or errors associated with a drive unit may be transmitted to the central server 1007 or/and control center 1009.

The system may further comprise a portable or mobile communication device, or other user device 1009 such as mobile telephone, tablet, laptop, or other communication device which may communicate with the server 1007 or directly with a drive unit 1001 using wired or wireless communication protocols (for example using WiFi®, third generation (3-G) or fourth generation (4-G) wireless protocols) which will be known to the skilled person. Usually, the communication device 1009 is associated with the passenger who has made a reservation for a ticket for a journey between an origin and destination.

The system may further comprise a control center console 1009, which may comprise computer hardware or software or both. The console 1009 is usually operated by airport management services and allows the airport to manage beacons within a particular area or airport. However, individual airlines may also operate the control console.

The web console 1009 usually resides on a separate computer or server, but in principle may be part of central server 1007. The web console 1009 may comprise software or hardware which when executed may perform one or more of the method steps described with particular reference to the control center. The web console may be communicatively coupled to the server 1007 and in particular to the departure control system 1003.

The control means of the drive may determine the location of the drive unit. This may be performed, for example using GPS or by triangulation of wireless communication signals. Further, the mobile drive unit may navigate using the laser scanners which detects features or obstacles and navigates around them.

The processor of the control means can then compare the location to one or more waypoints associated with a predetermined route, such as a route from a base station to a check-in area. Usually, the drive unit processor selects the waypoint closest to the current location and determines the drive vector (i.e. direction and distance) to that location. The drive unit then moves to the closest waypoint. Once at the one of the waypoint, the drive unit then control the differential drive mechanism so that the drive unit follow the predetermined course or route based on a comparison of the current know drive unit location and the location of the waypoints making up the predetermined route.

The drive unit may be provided with an ANT® navigation unit. This allows the processor to determine a position or location of the drive unit, and to control the movement of the drive unit along one or more predetermined virtual paths. Such a navigation units are available from BlueBotics SA, of Jordils 41B, CH-1025, St-Sulpice, Switzerland.

In one example, each drive unit 1001 may comprise a memory (such as a ROM, RAM, or flash memory for example), preferably for storing a plurality of predetermined, different routes or paths. The memory may store a map depicting at least an area of a transport hub, and preferably at least an area of a transport hub in which the drive unit is location or to be located. The map may be generated by the drive unit 1001 through exploration of at least a portion of the transport hub. In particular, the drive unit 1001 may be configured to navigate through at least a portion of the transport and use one or more sensors to determine the relative locations of one or more objects and/or walls within the portion of the transport hub. The drive unit may then be configured to establish one or more predefined routes through the portion of the transport hub, between specified locations in the transport hub, such as check in areas.

Each of the plurality of predetermined paths may share a common origin or/and destination. For example, as shown in FIG. 2 of the drawings, the two different predetermined training paths 1021, 2021 share a common origin (i.e. the start of each paths are associated with the same location) but each route or path is defined by one or more different waypoints. This may have the benefit that if an obstruction is detected by laser scanners 10001 or 10003 in the selected path, that an alternative path may be selected to avoid the obstruction while still arriving at the destination. An OMRON™ laser scanner may be used for object detection/localization such as model OS 32C-SP1.

In one specific example, the drive unit may meet the following technical specification:
General
1.2 Autonomy: minimum 4 h, optimal 12 h
1.3 Battery charging via cable
Mobility
2.1 Max speed: 1 m/s
2.2 Ability to move forward and backward
2.3 Ability to turn on the spot
2.4 Max slopes: 3%
2.5 Max steps to overcome: 10 mm
2.5 Max gaps to overcome: 10 mm
Perception
3.1 360° safety by way of 2 safety laser scanners
3.2 Laser scanner plane at 100 mm+/−50 mm from ground
3.3 No perception above the laser plane
3.4 No perception below the laser plan
3.5 No detection of holes (staircases, sidewalks, etc.)
Navigation
4.1 Path following and obstacles avoidance available
4.2 Manual movement by joystick possible The mobile drive unit 1001 and/or the resource management system 301 may comprise computer hardware or software which when executed undertakes one or more predetermined method steps, which will be described in further detail with reference to FIGS. 10 to 14 of the drawings. The software may comprise one or more modules which may be communicatively coupled to the components of the mobile drive unit 1001 and/or the resource management system 301, for example via a bus or via other wired or wireless communication means. The resource management system 301 may comprise one or more of an application programming interface, API, 306. The API may be configured to provide one or more modules for central management of a fleet of mobile drive units.

Figure 10:
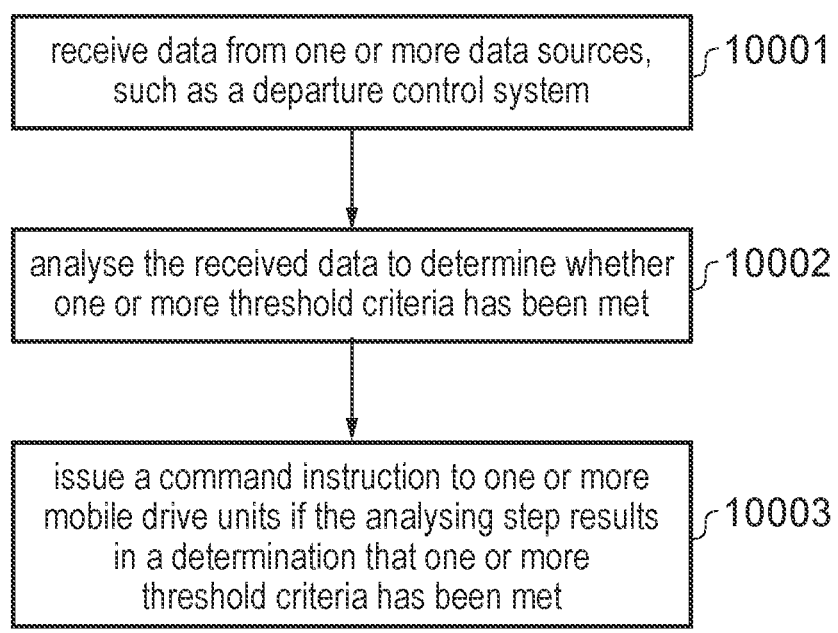
FIG. 10 is a flow diagram showing the main steps performed by an embodiment of the invention.

Referring now to the flow diagram of FIG. 10 of the drawings, the main steps performed by one embodiment of the invention will now be described. The method relates to the deployment of one or more mobile drive units at a transport hub. The steps are preferably performed at a server, such as the resource management platform.

At step 10001, data is received from one or more data sources, such as a departure control system. The data relates to the transport hub. For example, the data may relate to a flight that has been cancelled at the transport hub, or a flight that will shortly be departing from the transport hub. At step 10002, the received data is analysed to determine whether one or more threshold criteria has been met. At step 10003, a command instruction is issued to one or more mobile drive units if the analysing step results in a determination that the one or more threshold criteria has been met. The command instruction comprises an instruction for the one or more mobile drive apparatus to move to a specified location within the transport hub.

Figure 11:
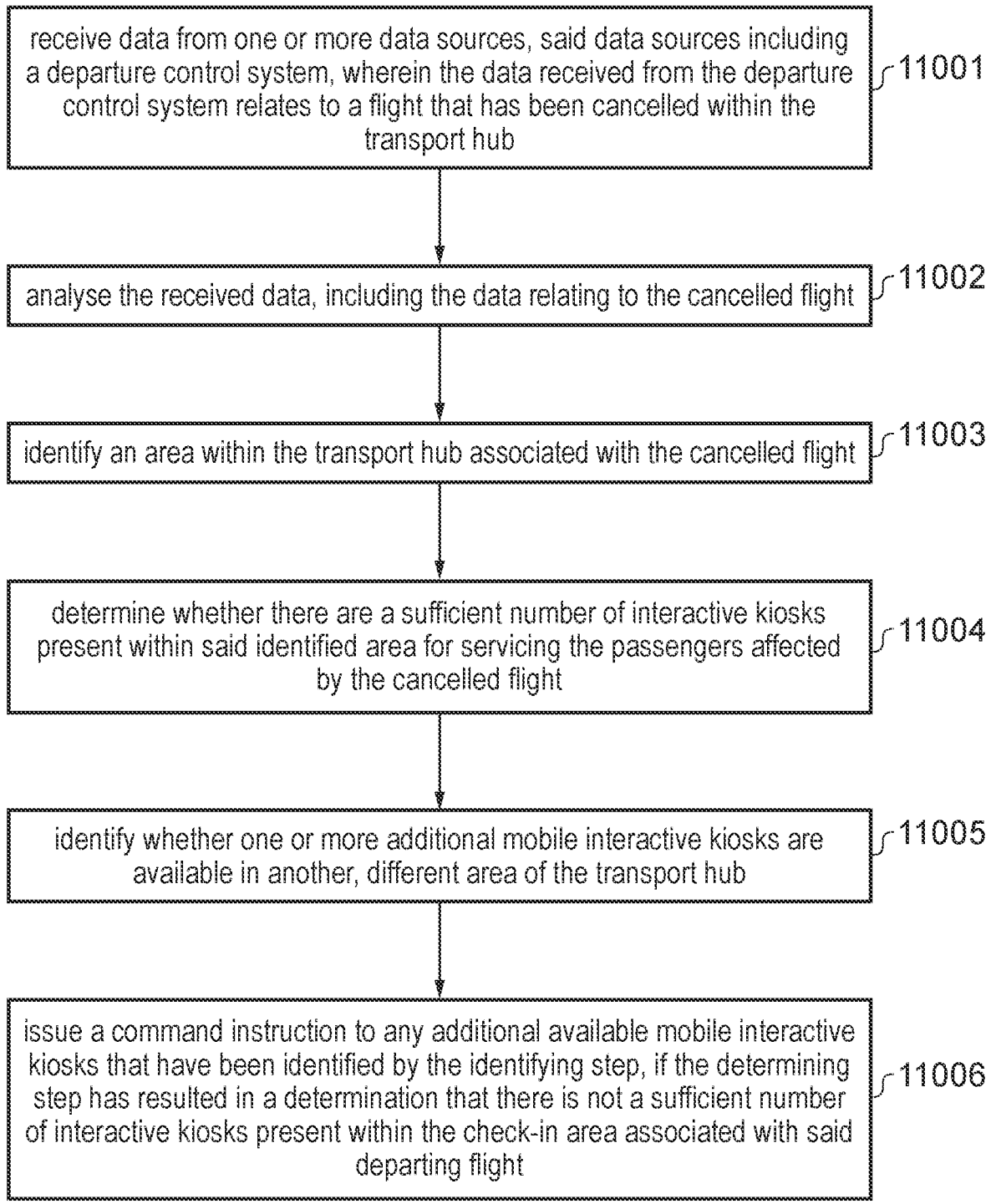
FIG. 11 is a flow diagram showing the main steps performed by another embodiment of the invention.

Referring now to the flow diagram of FIG. 11 of the drawings, the main steps performed by one embodiment of the invention will now be described. The method relates to the deployment of one or more mobile drive units at a transport hub. The steps are preferably performed at a server, such as the resource management platform.

At step 11001, data is received from one or more data sources, said data sources including a departure control system, wherein the data received from the departure control system relates to a flight that has been cancelled within the transport hub. The received data includes data that relates to a flight that has been cancelled within the transport hub. At step 11002, the received data is analysed. At step 11003, an area within the transport hub associated with the cancelled flight is identified. At step 11004, it is determined whether there are a sufficient number of interactive kiosks present within said identified area for servicing the passengers affected by the cancelled flight. The determination step 11004 is based at least in part on a rules based engine, preferably utilising data received from the one or more data sources. At step 11005, an identification is made as to whether one or more additional mobile interactive kiosks are available in another, different area of the transport hub. At step 11006, a command instruction is issued to any additional available mobile interactive kiosks that have been identified, if the determining step has resulted in a determination that there is not a sufficient number of interactive kiosks present within the area associated with the cancelled flight. The command instruction comprises an instruction for said identified and available one or more kiosks to move to the area associated with the cancelled flight.

Figure 12:
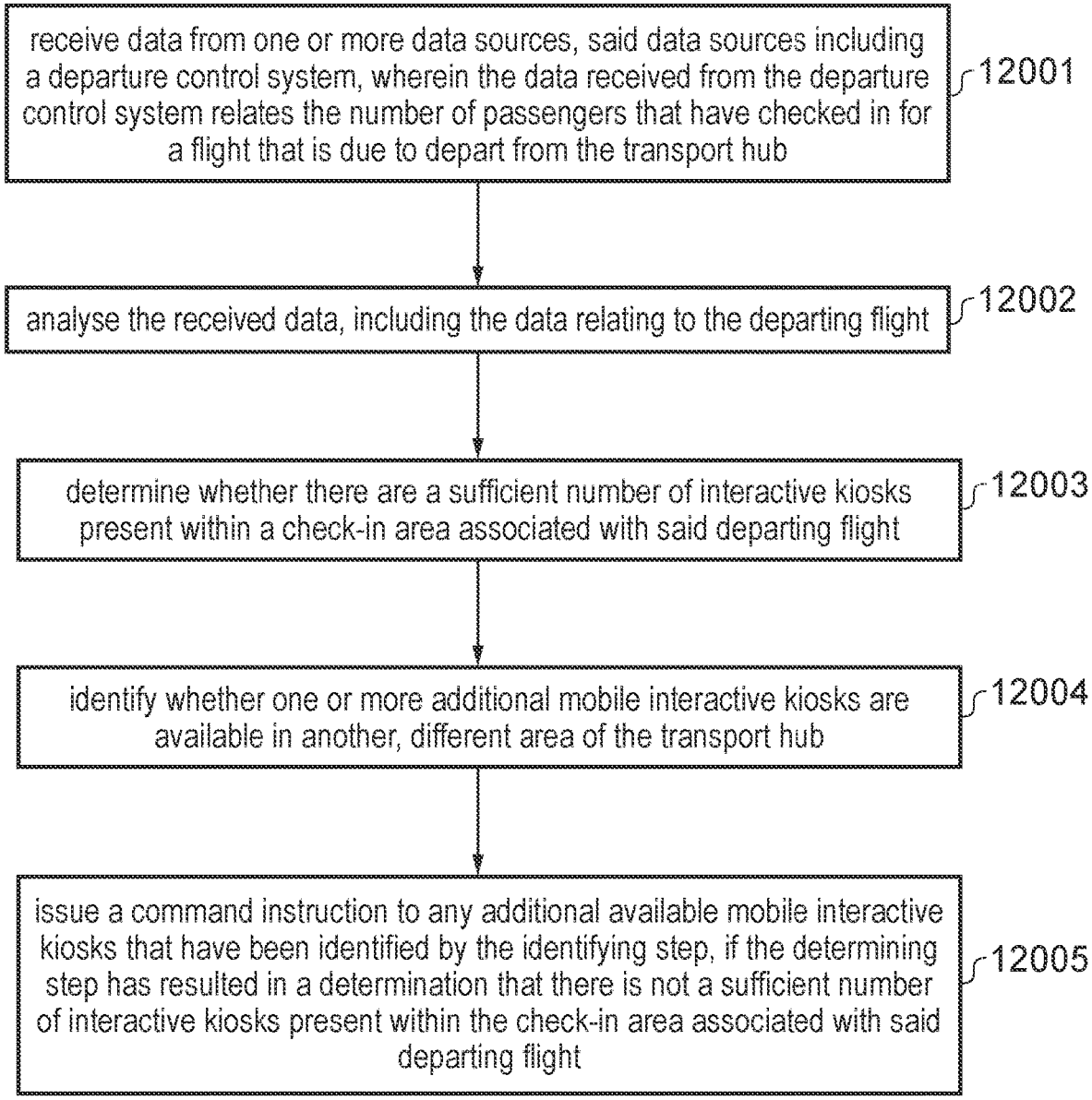
FIG. 12 is a flow diagram showing the main steps performed by yet another embodiment of the invention.

Referring now to the flow diagram of FIG. 12 of the drawings, the main steps performed by one embodiment of the invention will now be described. The method relates to the deployment of one or more mobile drive units at a transport hub. The steps are preferably performed at a server, such as the resource management platform.

At step 12001, data is received from one or more data sources. The data sources include a departure control system. The data received from the departure control system relates the number of passengers that have checked in for a flight that is due to depart from the transport hub. At step 12002, the received data is analysed. This includes the data relating to the departing flight, preferably together with data received from at least one other data source. At step 12003, a determination is made as to whether there are a sufficient number of interactive kiosks present within a check-in area associated with said departing flight. This is based at least in part on a rules based engine and the data received from the departure control system. At step 12004, an identification is made as to whether one or more additional mobile interactive kiosks are available in another, different area of the transport hub. At step 12005, a command instruction is issued to any additional available mobile interactive kiosks that have been identified by the identifying step. Step 12005 is conducted if the determining step has resulted in a determination that there is not a sufficient number of interactive kiosks present within the check-in area associated with said departing flight. The command instruction comprises an instruction for said identified and available one or more kiosks to move to the check-in area associated with said departing flight.

Figure 13:
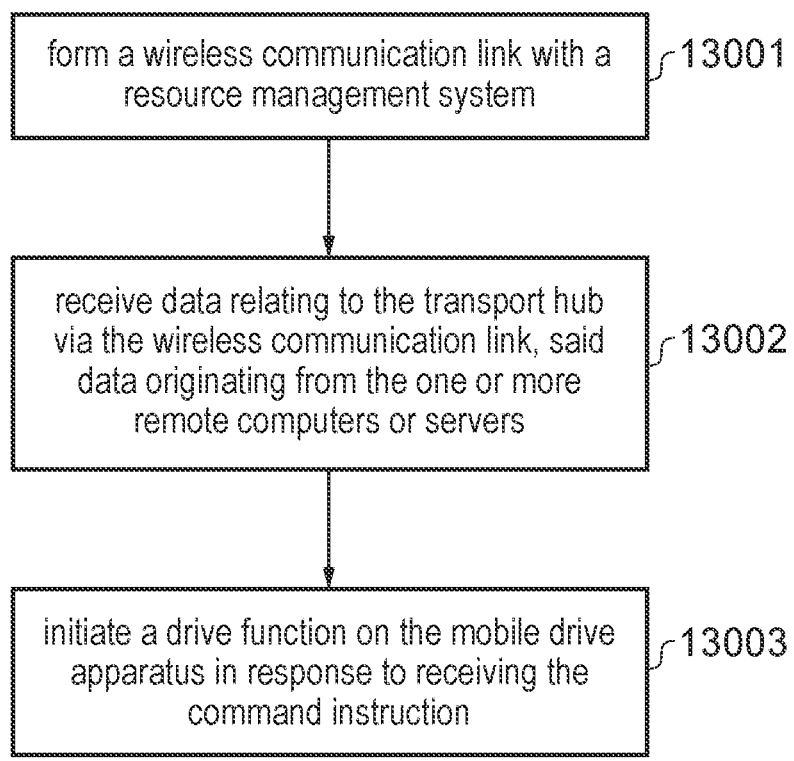
FIG. 13 is a flow diagram showing the main steps performed by a further embodiment of the invention.

Referring now to the flow diagram of FIG. 13 of the drawings, the main steps performed by one embodiment of the invention will now be described. The method relates to deployment of a mobile drive apparatus for use at a transport hub. The steps are preferably performed at a mobile drive apparatus, such as a mobile interactive kiosk.

At step 13001, a wireless communication link with a resource management system is formed, preferably via a wireless beacon within the transport hub. At step 13002, a command instruction is received from the resource management system via the wireless communication link. At step 13003, a drive function is initiated on the mobile drive apparatus in response to receiving the command instruction. The drive function is configured to drive the apparatus from a first location to a second location within the transport hub.

Figure 14:
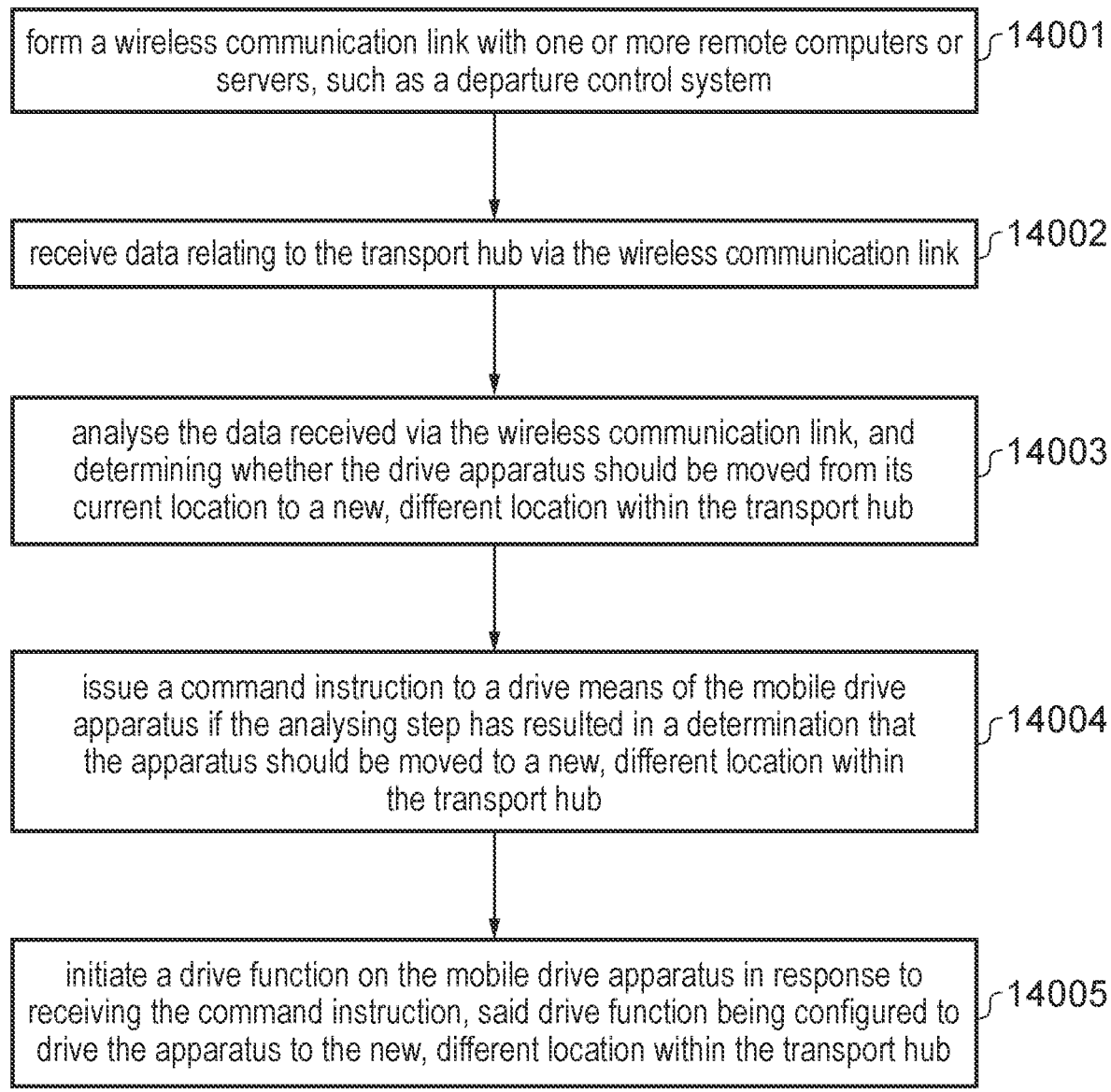
FIG. 14 is a flow diagram showing the main steps performed by yet a further embodiment of the invention.

Referring now to the flow diagram of FIG. 14 of the drawings, the main steps performed by one embodiment of the invention will now be described. The method relates to deployment of a mobile drive apparatus for use at a transport hub. The steps are preferably performed at a mobile drive apparatus, such as a mobile interactive kiosk.

At step 14001, a wireless communication link is formed with one or more remote computers or servers, such as a departure control system, preferably via a wireless beacon within the transport hub. At step 14002, data is received relating to the transport hub via the wireless communication link. The data originates from the one or more remote computers or servers. At step 14003, the received data is analysed and a determination is made as to whether the drive apparatus should be moved from its current location to a new, different location within the transport hub. The determination is preferably based at least in part on a rules based engine and the data received from the departure control system. At step 14004, a command instruction is issued to a drive means of the mobile drive apparatus. The command instruction is issued if the analysing step 14003 has resulted in a determination that the apparatus should be moved to a new, different location within the transport hub. At step 14005, a drive function is initiated on the mobile drive apparatus in response to receiving the command instruction. The drive function is configured to autonomously drive the apparatus to the new, different location within the transport hub.

From the foregoing, it will be appreciated that the mobile communication or client device may include a computing device, such as a desktop computer, a laptop computer, a tablet computer, a personal digital assistant, a mobile telephone, a smartphone, an internet enabled television, an internet enabled television receiver, an internet enabled games console or a portable games device.

The server may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers. The user interface described above may comprise a Graphical User Interface.

Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as circuit board which may include a CPU, a bus, RAM, flash memory, one or more ports for operation of connected I/O apparatus such as printers, display, keypads, sensors and cameras, ROM, a communications sub-system such as a modem, and communications media.

The flowcharts of FIGS. 10 to 14 illustrate the operation of example implementations of systems, methods, and computer program products according to various embodiments or aspects of the present invention. Each block in the flowchart or block diagrams may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

The invention claimed is:

1. A mobile drive apparatus for use at a transport hub, the apparatus comprising:
    a drive motor or drive motors configured to drive the apparatus from a first location to a second location within the transport hub;
    a wireless communication module and antenna configured to form a wireless communications link with one or more remote computers or servers, and receive data from each of the one or more remote computers or servers relating to the transport hub; and
    a control processor coupled to the drive motor(s) and coupled to the wireless communication module and antenna;
    a memory storing a plurality of predetermined paths through the transport hub between the first location and the second location within the transport hub;
    wherein the control processor is configured to:
        analyse the data received from each of the one or more remote computers or servers, and
        determine whether the apparatus should be moved from the first location to the second location within of the transport hub;
    and wherein, if the control processor determines that the apparatus should be moved to the second location, the control processor is further configured to issue a command instruction to the drive motor(s) to control the drive motor(s) to move the apparatus to the second location along a selected path of the plurality of predetermined paths stored in the memory; and
    wherein if the mobile drive apparatus detects an obstruction on the selected path, the control processor is further configured to select an alternative path from the plurality of predetermined paths stored in the memory, and control the drive motor(s) to move the apparatus along the selected alternative path to the second location.

2. The mobile drive apparatus according to claim 1, wherein the control processor is configured to receive and analyse data from two or more different data sources, and issue the command instruction to the drive motor(s) based on the analysis of the data received from the two or more data sources.

3. The mobile drive apparatus according to claim 1, wherein the command instruction comprises a locational component for indicating the second location within the transport hub that the apparatus should move to; and
    wherein the command instruction comprises a temporal component for indicating when the apparatus should move to the second location within the transport hub.

4. The mobile drive apparatus according to claim 1, wherein the memory stores a map depicting at least an area of the transport hub, and wherein the apparatus is configured to use the map to navigate between the first location and the second location within the area of the transport hub, along one or more of the plurality of predetermined paths stored in the memory.

5. The mobile drive apparatus according to claim 1, wherein the apparatus comprises one or more sensors configured to detect one or more objects in proximity to the apparatus and alert the control processor, in the event that an object is detected.

6. The mobile drive apparatus according to claim 1, wherein the apparatus is an interactive kiosk.

7. The mobile drive apparatus according to claim 1, wherein the interactive kiosk is configured to provide one or more of the following services or functions: check-in, flight booking, flight re-booking, ticket changing, airport information, flight status checking, document verification, passenger verification, boarding pass printing, and bag tag printing.

8. The mobile drive apparatus according to claim 1, wherein the obstruction is detected by laser scanning.

9. A method of deploying a mobile drive apparatus for use at a transport hub, the method comprising, at the mobile drive apparatus:
    forming a wireless communication link with one or more remote computers or servers;
    receiving data relating to the transport hub via the wireless communication link, said data originating from the one or more remote computers or servers;
    analysing the data received via the wireless communication link;
    determining whether the drive apparatus should be moved from a first location to a second location within the transport hub;
    issuing a command instruction to a drive motor or motors of the mobile drive apparatus if the analysing step has resulted in a determination that the apparatus should be moved to the second location within the transport hub;

initiating a drive function on the mobile drive apparatus in response to receiving the command instruction, said drive function being configured to drive the apparatus to the second location within the transport hub along a selected path of a plurality of predetermined paths through the transport hub between the first location and the second location, said plurality of predetermined paths being stored in a memory of the mobile drive apparatus; and if the mobile drive apparatus detects an obstruction on the selected path, selecting an alternative path from the plurality of predetermined paths stored in the memory, and controlling the drive motor(s) to move the apparatus along the selected alternative path to the second location.

* * * * *